(12) United States Patent
Silny et al.

(10) Patent No.: US 8,189,179 B2
(45) Date of Patent: May 29, 2012

(54) SYSTEM AND METHOD FOR HYPERSPECTRAL AND POLARIMETRIC IMAGING

(75) Inventors: John F. Silny, Los Angeles, CA (US); Eric M. Moskun, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 167 days.

(21) Appl. No.: 12/833,926

(22) Filed: Jul. 9, 2010

(65) Prior Publication Data

US 2012/0008133 A1    Jan. 12, 2012

(51) Int. Cl.
*G01N 21/00* (2006.01)

(52) U.S. Cl. ............................ 356/73; 356/328; 356/364

(58) Field of Classification Search .................. 356/327, 356/328, 72–73, 364
See application file for complete search history.

(56) References Cited

U.S. PATENT DOCUMENTS

| | | | |
|---|---|---|---|
| 4,650,321 A * | 3/1987 | Thompson | 356/73 |
| 4,844,617 A * | 7/1989 | Kelderman et al. | 356/328 |
| 5,225,893 A | 7/1993 | Whitney et al. | |
| 6,104,488 A | 8/2000 | LeVan | |
| 6,118,119 A * | 9/2000 | Ruschin | 356/328 |
| 7,038,776 B1 | 5/2006 | Ansley et al. | |
| 7,138,663 B2 | 11/2006 | Hoshuyama | |
| 7,554,572 B2 * | 6/2009 | Takahashi | 356/303 |
| 2004/0075830 A1 * | 4/2004 | Miyake et al. | 356/328 |
| 2007/0165223 A1 * | 7/2007 | Wilson et al. | 356/328 |

OTHER PUBLICATIONS

Lerner, Jeremy M., Imagining Spectrometer Fundamentals for Researchers in the Biosciences—A Tutorial, In'l Society for Analytical Cytology, Cytometry Part A 69A, pp. 712-734 (2006).

* cited by examiner

*Primary Examiner* — Kara E Geisel
(74) *Attorney, Agent, or Firm* — Lando & Anastasi, LLP

(57) ABSTRACT

Embodiments of a system and method for collecting hyperspectral and polarimetric data that are spatially and temporally coincident include a dispersive element configured to receive incident electromagnetic radiation. The dispersive element is configured to disperse a non-zero order of the electromagnetic radiation into its constituent spectra, which is directed to a first focal plane array, and may be read out as hyperspectral data. The dispersive element is also configured to reflect a zero order of the electromagnetic radiation, which is directed through a polarity discriminating element to a second focal plane array, which may be read out as polarimetric data. By synchronously reading out the first and second focal plane arrays, the hyperspectral and polarimetric data may be both spatially and temporally coincident.

23 Claims, 8 Drawing Sheets

SYSTEM AND METHOD FOR HYPERSPECTRAL AND POLARIMETRIC IMAGING

BACKGROUND

This disclosure relates generally to object detection. More particularly, this disclosure relates to the collection of hyperspectral and polarimetric data for material detection and identification.

The measurement and interpretation of polarized electromagnetic radiation is useful in a multitude of contexts, including for material detection and identification. The polarization state of reflected or emitted electromagnetic radiation may indicate a change in observed material. For example, different natural resources may reflect electromagnetic radiation in different polarization states. Additionally, some man-made objects may have unique polarimetric characteristics that would distinguish them from surrounding environments.

Likewise, hyperspectral imaging is also useful in material identification, allowing the chemical composition of targets to be characterized based on the spectroscopic data obtained from the dispersion of the observed electromagnetic radiation into their constituent spectral bands.

To obtain both hyperspectral and polarimetric data for a given target, two independent sensors (i.e. a hyperspectral sensor and a polarimetric sensor) are commonly used. Where these sensors are on separate hosts, simultaneous imaging can occur, but only with difficulty as the electromagnetic radiation is subject to different conditions, such as viewing angle and illumination, for the hyperspectral and the polarimetric analysis. Where the sensors are on a common host, an amplitude beam splitter or other similar optical component is needed to co-align the separate fields of view, adding to complexity and expense.

The present application provides, among other things, improvements over known techniques to collect hyperspectral and polarimetric data, and in particular to collect hyperspectral and polarimetric data that is both spatially and temporally coincident.

SUMMARY

According to an embodiment, an imaging system includes a first focal plane array and a second focal plane array. The second focal plane array of the imaging system may have an associated polarity discriminating element. The imaging system further includes a dispersive element that is configured to receive incident electromagnetic radiation. The dispersive element may be configured to disperse a non-zero order of the electromagnetic radiation into a constituent spectra, and direct the constituent spectra onto the first focal plane array. The dispersive element may be further configured to reflect a zero order of the electromagnetic radiation through the polarity discriminating element, and onto the second focal plane array as polarized electromagnetic radiation.

According to another embodiment, an imaging system includes a dispersive element configured to receive incident electromagnetic radiation. In the imaging system, the diffraction grating may be configured to disperse a lower diffraction order of the electromagnetic radiation into a longer wavelength band electromagnetic radiation. Additionally, the diffraction grating may be configured to disperse a higher diffraction order of the electromagnetic radiation into a shorter wavelength band electromagnetic radiation. The diffraction grating may be further configured to reflect a zero diffraction order of the electromagnetic radiation as reflected electromagnetic radiation. The imaging system may additionally include a two-color focal plane array and a second focal plane array. The two-color focal plane array may have an upper active area and a lower active area. In one implementation, the upper active area is configured to absorb the shorter wavelength band electromagnetic radiation, and the lower active area is configured to absorb the longer wavelength band electromagnetic radiation. The second focal plane array may have an associated polarity discriminating filter that is configured to receive the reflected electromagnetic radiation from the zero diffraction order, and polarize the reflected electromagnetic radiation as polarized electromagnetic radiation. The second focal plane array may be configured to receive the polarized electromagnetic radiation from the associated polarity discriminating filter.

According to another embodiment, a method for imaging includes receiving electromagnetic radiation on a dispersive element configured to diffract the electromagnetic radiation into a zero order electromagnetic radiation and at least one non-zero order electromagnetic radiation. The method further includes receiving the non-zero order electromagnetic radiation on a first focal plane array. The method may additionally include polarizing the zero order electromagnetic radiation into polarized electromagnetic radiation, and receiving the polarized electromagnetic radiation on a second focal plane array. The method further provides for synchronously reading out hyperspectral data from the first focal plane array, and polarimetric data from the second focal plane array.

These and other features and characteristics of the disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Various features of embodiments of this disclosure are shown in the drawings, in which like reference numerals designate like elements. The drawings form part of this original disclosure in which.

DETAILED DESCRIPTION

Figure 1:
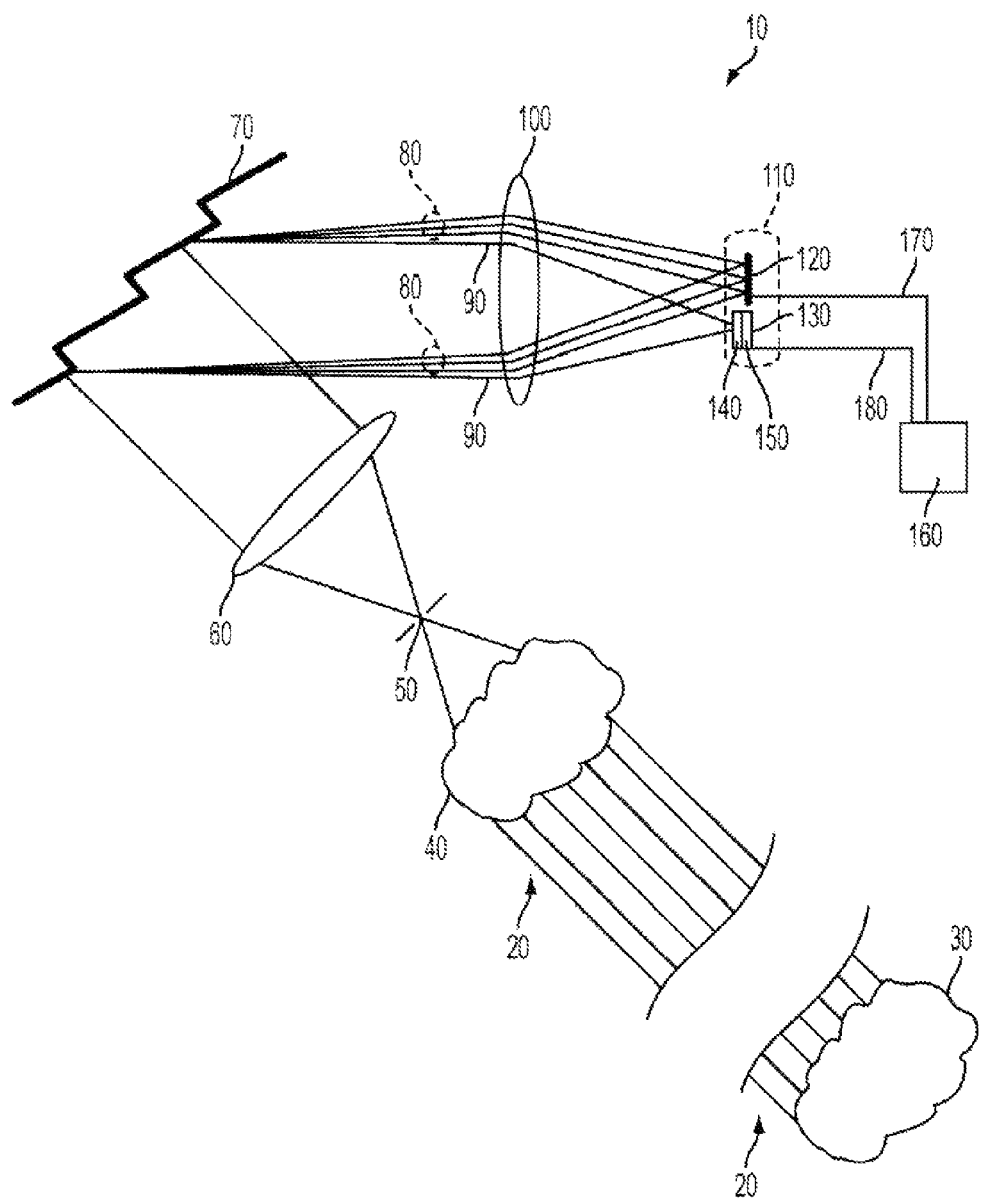
FIG. 1 shows a schematic view of an embodiment of an imaging system having a dispersive element.

FIG. 1 illustrates imaging system 10 receptive to electromagnetic radiation 20 from target area 30. Electromagnetic radiation 20 may be of any suitable type, including but not limited to visible light, infrared light, and ultraviolet light. Target area 30 may be any suitable area to be imaged, including but not limited to space-based objects and ground-based objects. Target area 30 may be observed from the ground (i.e. looking across to other ground-based objects, or up to observe other space-based objects), or from space (i.e. looking down upon ground-based objects, or across to other space-based objects). In various situations, target area 30 may be other satellites, stellar objects, earth based mineral deposits, forests, deserts, bodies of water, or any other body that reflects or emits electromagnetic radiation 20. In an embodiment, imaging system 10 may be mounted to a satellite. In other embodiments, imaging system 10 may be mounted to manned or un-manned airplanes.

In an embodiment, imaging system 10 may comprise fore-optics 40 which may focus, shape, or otherwise enhance electromagnetic radiation 20. In an embodiment, fore-optics 40 may comprise a telescope, one or more lenses, or one or more mirrors. In an embodiment where imaging system 10 comprises slit 50, fore-optics 40 may be configured to focus electromagnetic radiation 20 at slit 50. In some embodiments, including the illustrated embodiment, imaging system 10 may further comprise collimator 60, configured to align electromagnetic radiation 20. In those embodiments, collimator 60 may be of any construction or configuration, including but not limited to comprising one or more lenses and/or one or more mirrors. In an embodiment, collimator 60 may be positioned to receive electromagnetic radiation 20 as electromagnetic radiation 20 defocuses following passage through slit 50.

As FIG. 1 illustrates, imaging system 10 further comprises dispersive element 70 configured to receive electromagnetic radiation 20. Dispersive element 70 is configured to disperse a non-zero order of electromagnetic radiation 20 into constituent spectra 80. Dispersive element 70 is further configured to reflect a zero order of electromagnetic radiation 20 as reflected electromagnetic radiation 90. In an embodiment, dispersive element 70 may be any suitable optical device configured to both disperse and reflect electromagnetic radiation 20. For example, in an embodiment, dispersive element 70 may comprise diffraction grating. In an embodiment, dispersive element 70 may permit spatial coincidence of spectra 80 and reflected electromagnetic radiation 90. Dispersive element 70 is described in greater detail below.

In an embodiment, imaging system 10 may further comprise imager optics 100. In an embodiment, imager optics 100 are configured to focus, shape, or otherwise enhance spectra 80 and reflected electromagnetic radiation 90 onto focal plane 110. In an embodiment, focal plane 110 may comprise first focal plane array 120 and second focal plane array 130. First focal plane array 120 and second focal plane array 130 may each be any suitable imaging array, including but not limited to a charge-coupled device (CCD), a Complimentary Metal-Oxide-Semiconductor (CMOS) based image sensor, a Mercury Cadmium Telluride (HgCdTe) based sensor, an Indium Antimonite (InSb) based sensor, or an Indium Gallium Arsenide (InGaAs) based sensor. In an embodiment, as shown in FIG. 1, spectra 80 may be focused onto first focal plane array 120, while reflected electromagnetic radiation 90 may be focused onto second focal plane array 130. In an embodiment, first focal plane array 120 and second focal plane array 130 may be of the same length, corresponding to a spatial dimension of target area 30, however first focal plane array 120 may be of a greater width, configured to receive a determined wavelength range of spectra 80. In an embodiment, first focal plane array 120 may be sensitive to hyperspectral wavelength ranges. As shown, associated with second focal plane array 130 is polarity discriminating element 140. In an embodiment, polarity discriminating element 140 may be configured to permit determination of a polarization of electromagnetic radiation 20, as reflected as reflected electromagnetic radiation 90. In an embodiment, reflected electromagnetic radiation 90 is reflected directly or indirectly through polarity discriminating element 140, whereby it is received by second focal plane array 130 as polarity discriminated electromagnetic radiation 150. Polarity discriminating element 140 is described in greater detail below. In an embodiment, first focal plane array 120 and second focal plane array 130 may be constituent parts of a single focal plane array element. In such an embodiment, the polarity discriminating element 140 may be associated with only second focal plane array 130 of the single focal plane array element.

Imaging system 10 may further comprise classifier 160. In an embodiment, classifier 160 may be receptive to spectra 80 as received on first focal plane array 120 and polarity discriminated electromagnetic radiation 150 as received on second focal plane array 130. In an embodiment, classifier 160 may be receptive to spectral data 170 read out from first focal plane array 120, and receptive to polarimetric data 180 read out from second focal plane array 130. In an embodiment, first focal plane array 120 and second focal plane array 130 may share a common readout clock. In an embodiment, the common readout clock may be part of classifier 160. In an embodiment, the common readout clock may comprise a first readout clock associated with first focal plane array 120, and a second readout clock associated with second focal plane array 130. In an embodiment, the first and second readout clocks may be synchronized. In an embodiment, the common readout clock, which may or may not comprise first and second readout clocks, may be part of classifier 160. In an embodiment, the common readout clock may permit temporal coincidence of spectral data 170 and polarimetric data 180. In an embodiment, the common readout clock may correlate spectral data 170 and polarimetric data 180. In an embodiment, the classifier 160 and/or the common readout clock may be configured to spatially and temporally co-register spectral data 170 and polarimetric data 180

Figure 2:
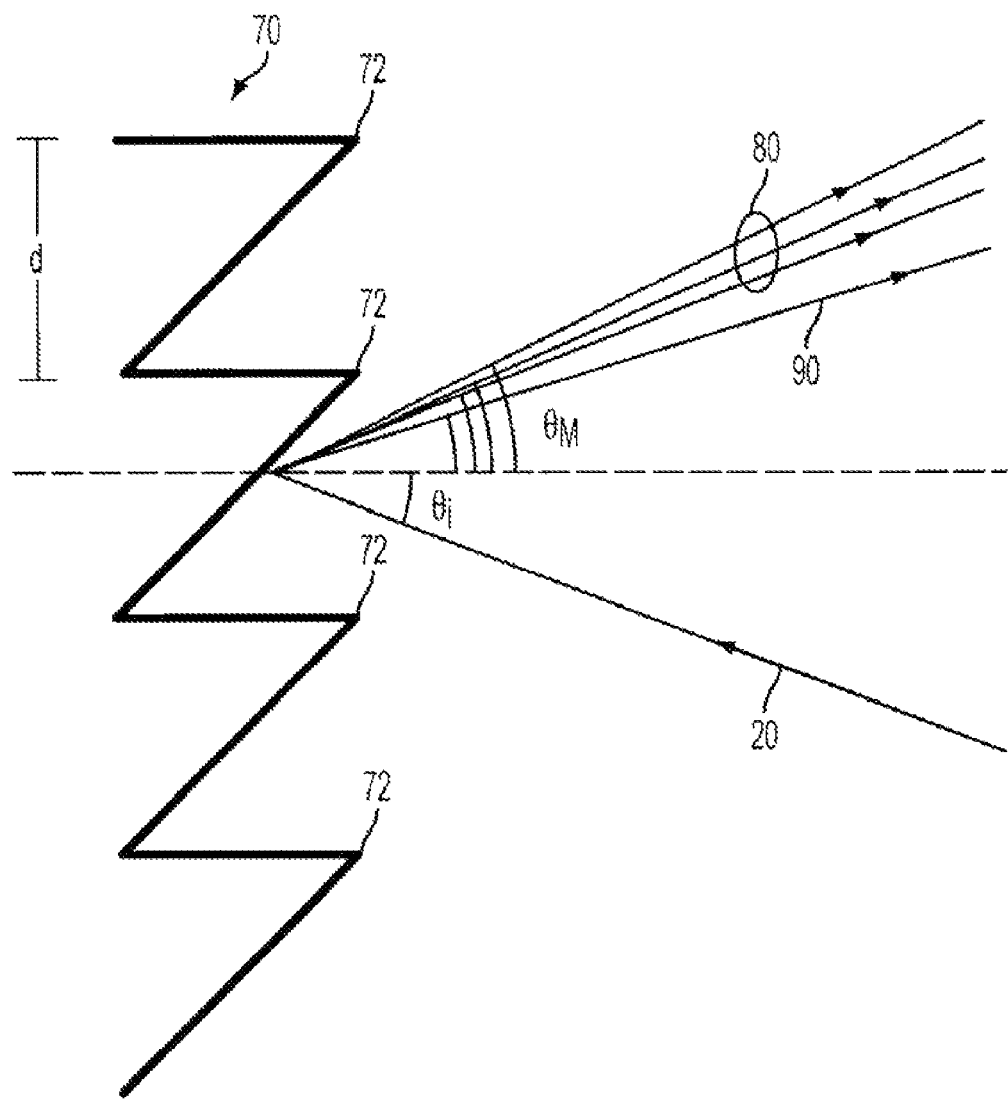
FIG. 2 illustrates the function of a dispersive element in the reflection and dispersion of electromagnetic radiation.

FIG. 2 shows a schematic of electromagnetic radiation 20 incident on dispersive element 70. In the illustrated embodiment, dispersive element 70 comprises a diffraction grating having peaks 72 of spacing d. Various other configurations of dispersive element 70 are also possible, including but not limited to grooves, slits, pits, or any other suitable element having a periodic structure to disperse and reflect electromagnetic radiation 20. As shown, incident electromagnetic radiation 20 may be emitted or reflected onto dispersive element 70, at an incident angle of $\theta_i$. Due to the shape and geometry of dispersive element 70, electromagnetic radiation 20 may be reflected and/or dispersed off of dispersive element 70 at a variety of orders m. The angle $\theta_o$ at which electromagnetic radiation 20 is reflected and/or dispersed by dispersive element 70 is dependant upon both the order m and the wavelength $\lambda$ of electromagnetic radiation 20, according to the formula $(m\lambda)/d = \sin\theta_i + \sin\theta_o$. Thus, as shown, a zero order (i.e. m=0) of electromagnetic radiation 20 impacting dispersive element 70 at angle $\theta_i$ is reflected as reflected electromagnetic radiation 90 such that $\theta_i = \theta_o$. On the other hand, non-zero orders of electromagnetic radiation 20 are dispersed by dispersive element 70 dependant on wavelength $\lambda$, such that $\theta_o = \sin^{-1}((m\lambda/d) - \sin(\theta_i))$. As such, for any given order m (for example, m=1) of electromagnetic radiation 20, electromagnetic radiation 20 is broken into constituent spectra 80 that is dispersed at different angles for each wavelength $\lambda$. Again, as noted, in an embodiment, dispersive element 70 may permit spatial coincidence of spectra 80 and reflected electromagnetic radiation 90.

Figure 3:
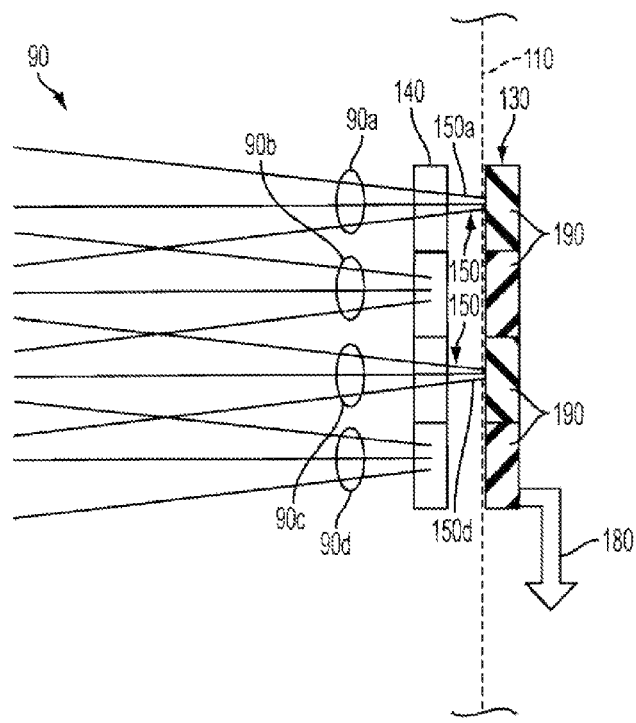
FIG. 3 shows an embodiment of a configuration for imaging the reflected electromagnetic radiation from the dispersive element.
Figure 4:
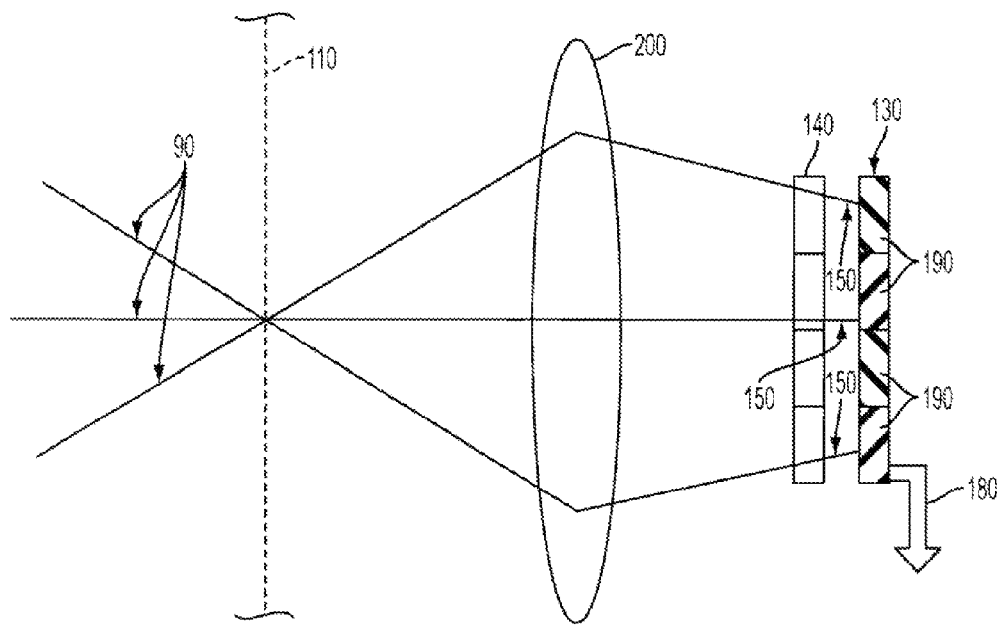
FIG. 4 shows another embodiment of a configuration for imaging the reflected electromagnetic radiation from the dispersive element.

As noted above, spectra 80 may be received on first focal plane array 120 to be interpreted as spectral data 170. On the other hand, reflected electromagnetic radiation 90 may be received by second focal plane array 130, through polarity discriminating element 140, to obtain polarimetric data 180. FIG. 3 and FIG. 4 show alternative embodiments of the configuration of second focal plane array 130 and polarity discriminating element 140 to obtain polarimetric data 180. For example, FIG. 3 shows an embodiment of an in-scan motion smear configuration of the second focal plane array 130 and associated polarity discriminating element 140. As illustrated, reflected electromagnetic radiation 90 is shown originating from different field points as electromagnetic radiation 90a-d. As further shown the electromagnetic radiation 90a-d may pass through the polarity discriminating element 140, wherein polarity discriminated electromagnetic radiation may selectively filter some of reflected electromagnetic radiation 90, permitting polarity discriminated electromagnetic radiation 150 (i.e. polarity discriminated electromagnetic radiation 150a and 150d based on their originating field points) through to second focal plane array 130. As shown, discriminated electromagnetic radiation 150 may be received on second focal plane array 130 over a plurality of pixels 190. More details of the configuration of the polarity discriminating element 140 are provided below.

FIG. 4 shows another embodiment of second focal plane array 130 and associated polarity discriminating element 140, arranged in a pupil imager configuration. As shown, reflected electromagnetic radiation 90 may be directed to converge at focal plane 110, before diverging and intersecting micro-lens 200. In an embodiment, micro-lens 200 may be configured to "scramble" and direct electromagnetic radiation 90 towards second focal plane array 130 through associated polarity discriminating element 140. Again, as shown, polarity discriminated electromagnetic radiation 150 may be permitted to pass through polarity discriminating element 140, to be received on second focal plane array 130, and output as polarimetric data 180.

Figure 5C:
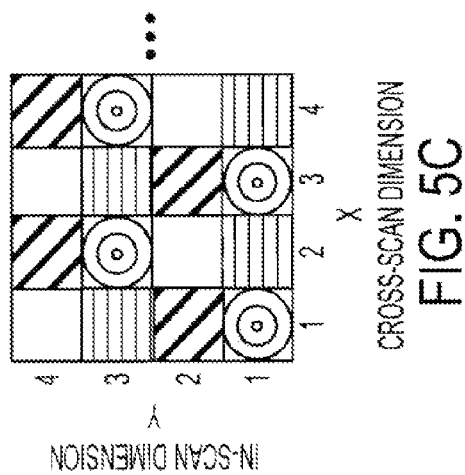
FIGS. 5A-C show various embodiments of a polarity discriminating filter used in imaging the reflected electromagnetic radiation.
Figure 5B:
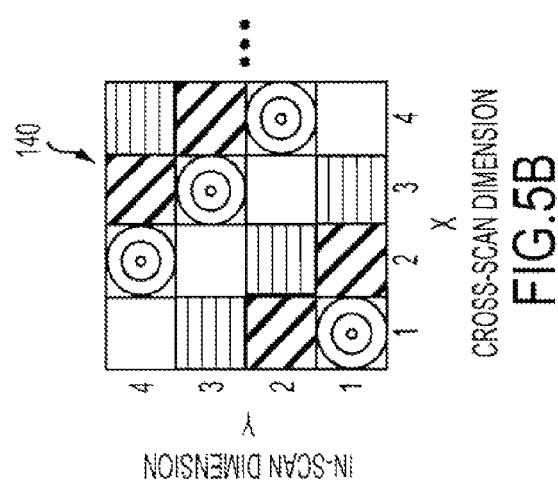
Figure 5A:
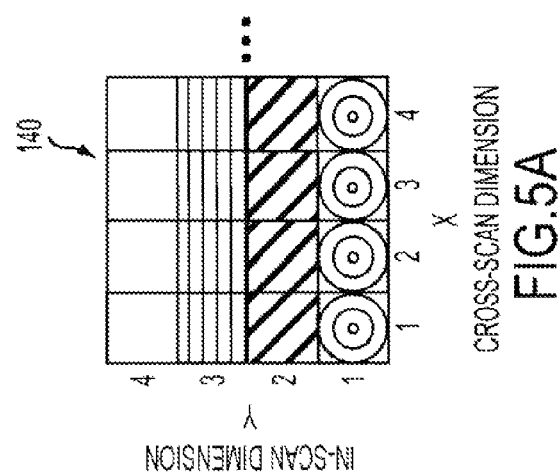

As noted above, the polarity discriminating element 140 may be configured to permit determination of a polarization of electromagnetic radiation 20, as reflected as reflected electromagnetic radiation 90. FIGS. 5A-C schematically show various embodiments of at least a portion of polarity discriminating element 140. As shown, polarity discriminating element 140 may comprise a plurality of polarizing filters 140 $(x,y)$, wherein $(x,y)$ is the numerical position on the demarked x and y coordinates of polarity discriminating element 140 in FIGS. 5A-C. In an embodiment, polarity discriminating element 140 may be characterized as a polarization filtering analogy of a Bayer filter (i.e. an RGBW filter). For example, in FIG. 5A, polarizing filters 140$(x,1)$ are circularly polarized, polarizing filters 140$(x,2)$ are linearly polarized at 45 degrees, and polarizing filters 140$(x,3)$ are linearly polarized. Also as shown, polarizing filters 140$(x,4)$ do not actually filter based on polarization, but instead permit all reflected electromagnetic radiation 90 incident on those polarizing filters 140$(x,4)$ to be received by second focal plane array 130. In another embodiment, such as shown in FIG. 5B, similar polarization filters 140$(x,y)$ may be offset by one element in the in-scan dimension (i.e. the y axis). In another embodiment, such as shown in FIG. 5C, similar polarization filters 140$(x,y)$ may be offset by two elements in the in-scan dimension. These embodiments are not limiting, and in other embodiments, a variety of patterns of polarization filters 140 $(x,y)$ may be utilized. In an embodiment, there may be an equal number of polarization filters 140$(x,y)$ in each of unfiltered reflected electromagnetic radiation 90, circularly polarized, linearly polarized, and linearly polarized $\pm 45$ degrees. Other combinations of polarization filters 140$(x,y)$ are possible, including, as one non-limiting example, the use of three polarization filters 140$(x,y)$, polarized at 0 degrees, 60 degrees, and 120 degrees respectively.

Figure 6C:
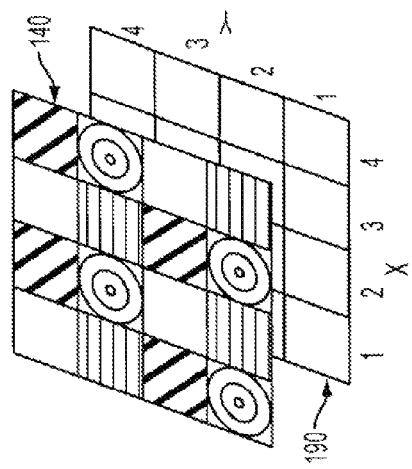
FIGS. 6A-C show the arrangements of the embodiments of the polarity discriminating filters of FIGS. 5A-C over respective focal plane arrays.
Figure 6B:
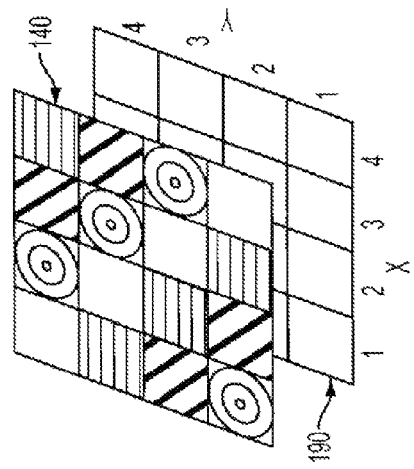
Figure 6A:
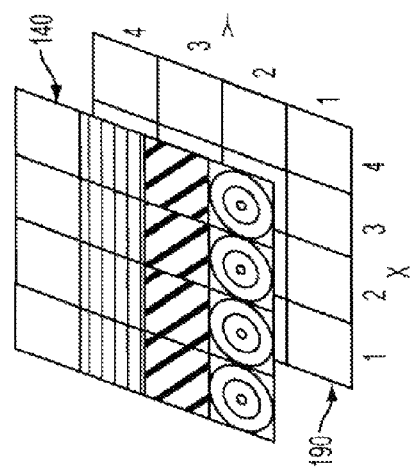

As seen in FIG. 6A-C, in an embodiment, each of polarization filters 140$(x,y)$ may correspond to each of plurality of pixels 190 of second focal plane array 130, such that polarization filter 140$(x,y)$ is associated with pixel 190$(x,y)$. In an embodiment, reflected electromagnetic radiation 90 incident on polarization filter 140$(x,y)$, that is permitted through polarization filter 140$(x,y)$, may then be received by associated pixel 190$(x,y)$ of second focal plane array 130. In an embodiment, classifier 160 knows the associated polarization filter 140$(x,y)$ for each pixel 190$(x,y)$. For example, classifier 160 may have access to a database listing in a memory device (not shown) of associated polarization filters 140 for each of the plurality of pixels 190.

By ascertaining the amount of reflected electromagnetic radiation 90 in each of the polarizations, Stokes parameters for the electromagnetic radiation 20 of the target area 30 may be ascertained. For example, in FIG. 6A, in which polarization filters 140$(x,4)$ permit incident reflected electromagnetic radiation 90, classifier 160 may characterize a reading from pixel elements 190$(x,4)$ as irradiance data $E_0$. Likewise, classifier 160 may characterize a reading from pixel elements 190$(x,3)$ as linear horizontal polarization data $E_1$. Similarly, classifier 160 may characterize a reading from pixel elements 190$(x,2)$ as linear +45 degree polarization data $E_2$. Similarly, classifier 160 may characterize a reading from pixel elements 190$(x,1)$ as circular polarization data $E_3$. In an embodiment, by reading out the values as polarimetric data 130, the polarization state of electromagnetic radiation 20 from the target area 30 may be computed, including, for example, the degree of polarization and the degree of linear polarization. As an example, the values $E_0$, $E_1$, $E_2$, and $E_3$ may be used to find the Stokes parameters such that:

$$\hat{S}_0 = 2E_0,$$

$$\hat{S}_1 = 2(E_1 - E_0),$$

$$\hat{S}_2 = 2(E_2 - E_0),$$

and $$\hat{S}_3 = 2(E_3 - E_0).$$

From the Stokes parameters, the Stokes vector may be found, such that $$S=[\hat{S}_0/\hat{S}_0, \hat{S}_1/\hat{S}_0, \hat{S}_2/\hat{S}_0, \hat{S}_3/\hat{S}_0]=[S_0, S_1, S_2, S_3].$$

The degree of polarization is then $(S_1^2+S_2^2+S_3^2)^{1/2}/S_0$, and the degree of linear polarization would then be $(S_1^2+S_2^2)^{1/2}/S_0$.

In an embodiment, the classifier 160 may be configured to compute one or more of the Stokes parameters, the degree of polarization of electromagnetic radiation 20, and the degree of linear polarization of electromagnetic radiation 20.

Figure 7:
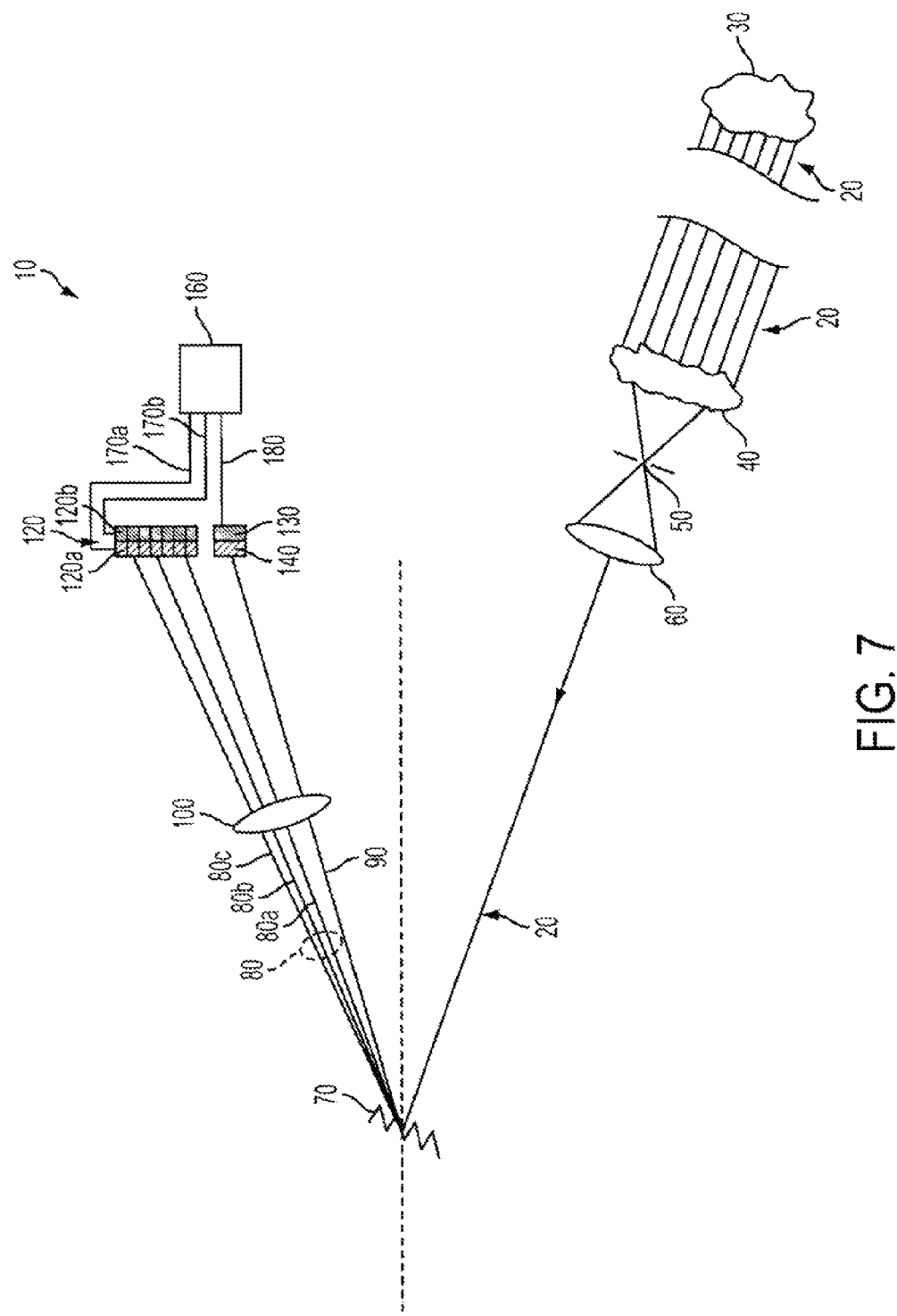
FIG. 7 shows a schematic view of an embodiment of an imaging system having a dispersive element and a two-color focal plane array element configured to receive spectra.

FIG. 7 provides a schematic of an alternative embodiment of imaging system 10. Similarly as described above, electromagnetic radiation 20 emitted from target area 30 may be received by fore-optics 40. Fore-optics 40 may shape or enhance electromagnetic radiation 20, where in an embodiment it may be focused on slit 50, before dispersing. In an embodiment, electromagnetic radiation 20 may then be aligned by collimator 60, and directed towards dispersive element 70, which may be any suitable optical device configured to both disperse and reflect electromagnetic radiation 20. As shown, dispersive element 70 remains configured to reflect a zero order of electromagnetic radiation 20 as reflected electromagnetic radiation 90, where it may pass through imager optics 100, which may focus, shape or enhance reflected electromagnetic radiation 90 through polarity discriminating element 140 onto second focal plane array 130. Dispersive element 70 is also again configured to disperse non-zero orders of electromagnetic radiation 20 into constituent spectra 80.

As shown in the embodiment of FIG. 7, dispersive element 70 may also be configured to direct electromagnetic radiation 20 in multiple discrete wavelength bands over multiple diffraction orders. For example, as illustrated, dispersive element 70 may be configured to diffract and disperse longer wavelength electromagnetic radiation 20 using a low diffraction order, while diffracting and dispersing shorter wavelength electromagnetic radiation 20 using a higher diffraction order. Again, as the diffraction spacing d is constant for the grating, output angle $\theta_o$ is dependant upon both wavelength of light $\lambda$ and diffraction order m, such that $\theta_o=\text{Sin}^{-1}[(m\lambda/d)-\sin(\theta_i)]$. Such a configuration may result in electromagnetic radiation of different wavelengths being diffracted with the same geometry (i.e. at the same angle). For example, in the non-limiting embodiment shown, three exemplary rays of spectra 80 are depicted, each representing electromagnetic radiation 20 being diffracted at angle $\theta_o$. At a smallest angle $\theta_o$ with respect to normal, spectra 80a may include, for example, $\lambda=6$ μm at m=1, and $\lambda=3$ μm at m=2. At a center angle with respect to normal, spectra 80b may include, for example, $\lambda=9$ μm at m=1, and $\lambda=4.5$ μm at m=2. At largest angle with respect to normal, spectra 80c may include, for example, $\lambda=12$ μm at m=1, and $\lambda=6$ μm at m=2. In an embodiment, spectra 80 at orders m=1 and m=2 may be spatially coincident with one another. In an embodiment, spectra 80 at orders m=1 and m=2 may both be spatially coincident with reflected electromagnetic radiation 90.

FIG. 7 further shows that in such an embodiment, spectra 80 may be received by first focal plane array 120, wherein first focal plane array 120 is a two-color focal plane array having both upper active area 120a and lower active area 120b. In this disclosure, the use of the term two-color focal plane array is defined as a focal plane array having at least an upper and lower active area 120a and 120b, and may comprise intermediate active areas, such that the focal plane array is sensitive to more than two-colors. In an embodiment, upper active area 120a may be configured to absorb shorter wavelength spectra 80, such as, for example, spectra 80 diffracted at a second order m=2. In the non-limiting example above, m=2 corresponds to wavelengths of $\lambda=3$ μm to $\lambda=6$ μm. In an embodiment, lower active area 120b may be configured to absorb longer wavelength spectra 80, such as, for example, spectra 80 diffracted at a first order m=1. In the non-limiting example above, m=1 corresponds to wavelengths of $\lambda=6$ μm to $\lambda=12$ μm.

Figure 8:
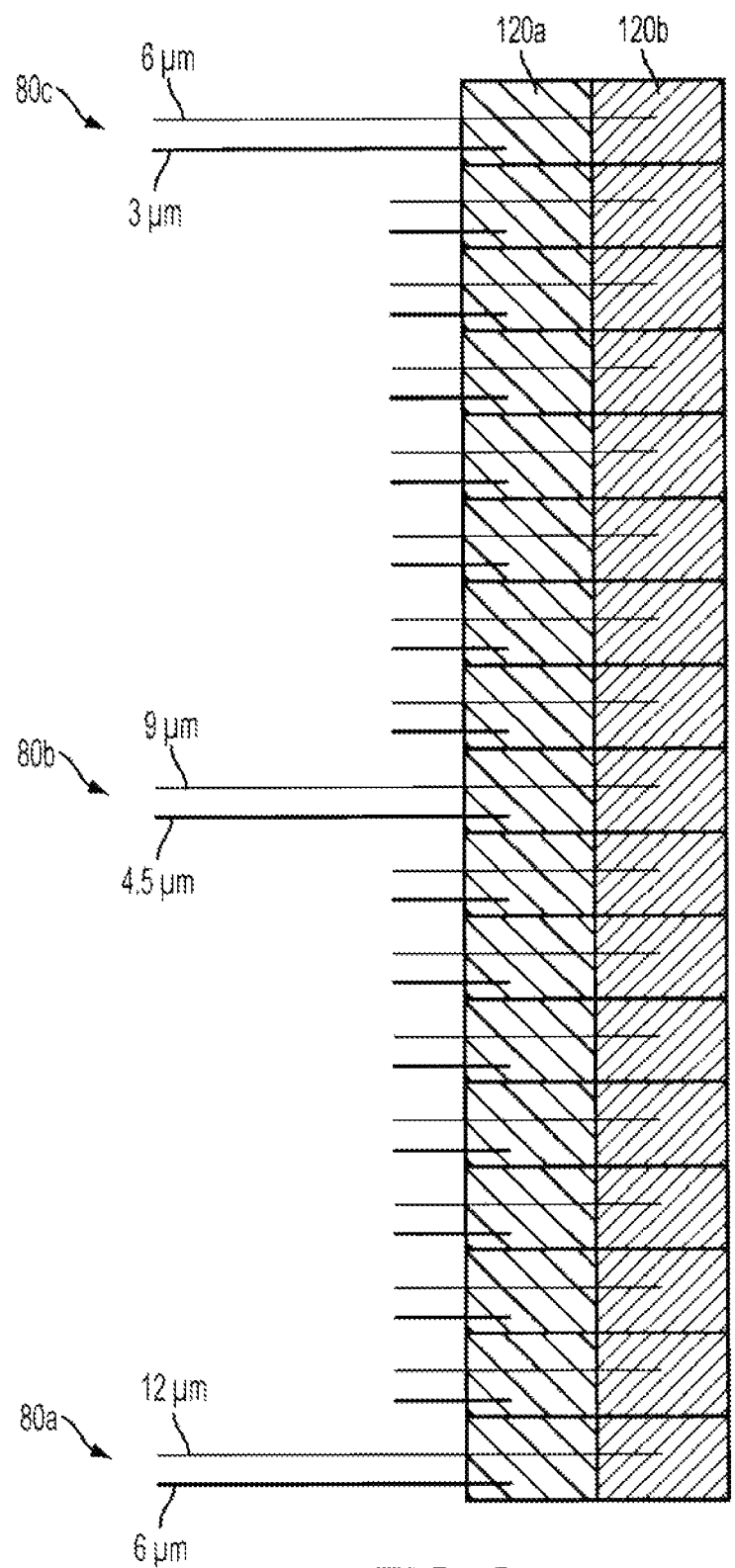
FIG. 8 shows an enhanced schematic view of the two-color focal plane array element of FIG. 7.

First focal plane array 120 of the embodiment of FIG. 7 is shown in greater detail in FIG. 8, wherein spectra 80 diffracted at first order m=1 and at second order m=2 are shown with a slight spatial offset for clarity. As shown, first focal plane array 120 is configured with both upper active area 120a and lower active area 120b. Upper active area 120a of the illustrated embodiment is configured to receive spectra 80 of lower order m=1, such that upper active area 120a receives spectra 80a of wavelength $\lambda=6$ μm, spectra 80b of wavelength $\lambda=4.5$ μm, and spectra 80c of wavelength 3 μm. Lower active area 120b of the illustrated embodiment is configured to receive spectra 80 of higher order m=2, such that lower active area 120a receives spectra 80a of wavelength $\lambda=12$ μm, spectra 80b of wavelength $\lambda=9$ μm, and spectra 80c of wavelength 6 μm. Also seen in FIG. 8 is that spectra 80 of order m=1 or m=2 is dispersed by dispersive element 70 as a band over the entirety of first focal plane array 120. Returning to FIG. 7, it is seen that in an embodiment both upper active area 120a and lower active area 120b may be configured to generate spectral data 170, including upper active area spectral data 170a and lower active area spectral data 170b.

In such an embodiment of imaging system 10, imaging system 10 may further comprise classifier 160. Classifier 160 may be any suitable system, including but not limited to one comprising or implemented by an appropriate algorithm operating on a processor, a programmed computer system, a computer network, or a database system. In various embodiments, classifier 160 may be a standalone computer connected to first and second focal plane arrays 120 and 130, or an embedded processor that may be part of imaging system 10, such as part of first and second focal plane arrays 120 and 130.

In an embodiment, classifier 160 may be receptive to spectra 80, as received on upper active area 120a and lower active area 120b of first focal plane array 120, and polarity discriminated electromagnetic radiation 150, as received on second focal plane array 130. In an embodiment, classifier 160 may be receptive to spectral data 170 read out from first focal plane array 120, which in an embodiment may comprise upper active area spectral data 170a read out from upper active area 120a, and lower active area spectral data 170b read out from lower active area 120b. In an embodiment, the classifier 160 may be receptive to polarimetric data 180 read out from second focal plane array 130.

In an embodiment, upper active area 120a and lower active area 120b may share a common readout clock. In an embodiment, upper active area 120a, lower active area 120b, and second focal plane array 130 may share the common readout clock. In an embodiment, the common readout clock may be part of classifier 160. In an embodiment, the common readout clock may comprise a first readout clock associated with upper active area 120a and lower active area 120b of first focal plane array 120, and a second readout clock associated with second focal plane array 130. In an embodiment, the first and second readout clocks may be synchronized. In an embodiment, the common readout clock, which may or may not comprise first and second readout clocks, may be part of classifier 160. In an embodiment, the common readout clock may permit temporal coincidence of spectral data 170 (including upper active area spectral data 170*a* and lower active area spectral data 170*b*) and polarimetric data 180. In an embodiment, the common readout clock may correlate upper active area spectral data 170*a* and lower active area spectral data 170*b*. In an embodiment, the common readout clock may correlate upper active area spectral data 170*a*, lower active area spectral data 170*b*, and polarimetric data 180. In an embodiment, the classifier 160 and/or the common readout clock may be configured to spatially and temporally co-register spectral data 170 (which may include both upper active area spectral data 170*a* and lower active area spectral data 170*b*) and polarimetric data 180.

Figure 9:
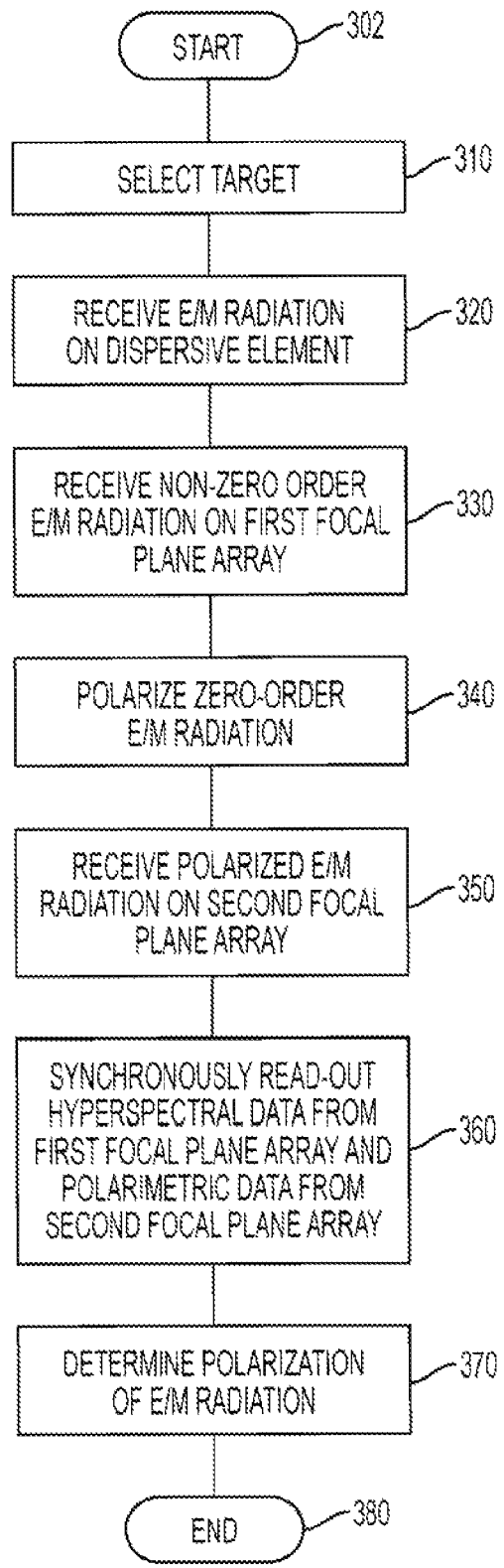
FIG. 9 shows a flow chart illustrating an embodiment of a method for conducting hyperspectral and polarimetric imaging.

As is illustrated in the non-limiting embodiment illustrated in the flowchart of FIG. 9, another aspect of the present disclosure may include imaging method 300. Method 300 may start at 302, and may include at step 310 selecting target area 30. As above, target area 30 may be may be any suitable area to be imaged, including but not limited to space-based objects and ground-based objects, observed from any suitable location, including the ground, the air, or from space. The selection of target area 30 at step 310 may be deliberate, such as with a targeting system, or by chance, such as in a data-gathering survey.

In an embodiment, method 300 may continue at step 320 by receiving electromagnetic radiation 20 on dispersive element 70, wherein dispersive element 70 is configured to diffract electromagnetic radiation 20 into zero-order electromagnetic radiation (i.e. reflected electromagnetic radiation 90) and at least one non-zero order electromagnetic radiation (i.e. spectra 80). Receiving electromagnetic radiation 20 on dispersive element 70 may be through any suitable intermediary, including receiving electromagnetic radiation 20 through fore-optics 40, which may include a telescope or any other optical element configured to shape, focus, or enhance electromagnetic radiation 20. In an embodiment, receiving electromagnetic radiation 20 on dispersive element 70 may further comprise collimating electromagnetic radiation 20.

Method 300 may also include at step 330 receiving non-zero electromagnetic radiation (i.e. spectra 80) on first focal plane array 120. In an embodiment, receiving non-zero polarimetric radiation on first focal plane array 120 may comprise dispersing, with dispersive element 70, electromagnetic radiation 20 into spectra 80. In an embodiment, non-zero electromagnetic radiation, such as spectra 80, may be focused through imager optics 100 before being received on first focal plane array 120. In an embodiment, imager optics 100 may be configured to focus, shape, or otherwise enhance spectra 80 and onto first focal plane array 120. As noted above, in an embodiment first focal plane array 120 may comprise a two-color focal plane array having upper active area 120*a* and lower active area 120*b*, wherein receiving the non-zero order electromagnetic radiation at step 330 may comprise receiving a shorter wavelength band of electromagnetic radiation on upper active area 120*a*, and receiving a longer wavelength band of electromagnetic radiation on lower active area 120*b*.

A further element of method 300 may comprise at step 340 polarizing zero order electromagnetic radiation (i.e. reflected electromagnetic radiation 90) into polarized electromagnetic radiations 150, with a polarizing element configured to permit determination of a polarization of electromagnetic radiation 20. In an embodiment, the polarizing element may be similar to or comprise polarity discriminating element 140 described above, and may comprise a plurality of polarizing filters 140(*x,y*) as depicted in FIG. 5A-C. In an embodiment, the polarized electromagnetic radiations may comprise polarity discriminated electromagnetic radiation 150. In an embodiment, the polarizing element may permit determination of the Stokes vectors for electromagnetic radiation 20, so as to permit determination of the degree of polarization and/or the degree of linear polarization of electromagnetic radiation 20.

Method 300 may continue to include at step 350 receiving the polarized electromagnetic radiation, such as polarity discriminated electromagnetic radiations 150 on second focal plane array 130. As above, in various embodiments receiving the polarized electromagnetic radiation may comprise utilizing the in-scan motion smear configuration of the second focal plane array 130 and associated polarity discriminating element 140. In an embodiment, polarity discriminated electromagnetic radiation 150 may be received on second focal plane array 130 over a plurality of pixels 190. In other embodiments, receiving the polarized electromagnetic radiation at step 350 may comprise utilizing the pupil imager configuration of the second focal plane array 130 and the polarizing element (such as the polarity discriminating element 140). Again, in such a configuration, reflected electromagnetic radiation 90 may be directed to converge at focal plane 110, before diverging and intersecting micro-lens 200, which may be configured to scramble electromagnetic radiation 90, and direct it towards second focal plane array 130, through associated polarity discriminating element 140.

Step 360 of method 300 may proceed to include synchronously reading out hyperspectral data 170 from first focal plane array 120 and polarimetric data 180 from second focal plane array 130. As described above, such a synchronous read-out of data from the first and second focal plane arrays 120 and 130 may comprise using classifier 160. In an embodiment, step 360 may comprise utilizing a common readout clock. In an embodiment, step 360 may comprise utilizing a first readout clock associated with first focal plane array 120 and a second readout clock associated with second focal plane array 130, wherein the first and second readout clocks are synchronized with one another. In an embodiment wherein first focal plane array 120 is a two-color focal plane array comprising upper active area 120*a* and lower active area 120*b*, synchronously reading out hyperspectral data 170 and polarimetric data 180 at step 360 may comprise utilizing a common readout clock shared by each of upper active area 120*a*, lower active area 120*b*, and second focal plane array 130.

Method 300 may then continue at step 370 by determining the polarization of electromagnetic radiation 20. In an embodiment, this determination may be calculated by classifier 160, or by any other process. Again, such determination of the polarization of electromagnetic radiation 20 may include determining the degree of polarization and/or the degree of linear polarization. In various embodiments, this data may be spatially and/or temporally co-registered with the hyperspectral data. This data may in an embodiment be output in any suitable form, including but not limited to an image, a chart, an animation, or so on. In an embodiment, the hyperspectral data 170 and polarimetric data 180 may be compared to a database to identify a likely candidate for the material in target area 30 that is the reflective or emissive source of electromagnetic radiation 20. Finally, method 300 may end at step 380.

Although the inventive concept has been described in detail for the purpose of illustration based on what is currently considered to be the most practical and useful embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that this disclosure contemplates that, to the extent possible, one or more features of any embodiment can be combined with one or more features of any other embodiment.

What is claimed is:

1. An imaging system receptive to electromagnetic radiation, the imaging system comprising:
   a dispersive element configured to receive the electromagnetic radiation;
   a first focal plane array;
   a second focal plane array, having an associated polarity discriminating element configured to permit determination of a polarization of the electromagnetic radiation;
   wherein the dispersive element is configured to disperse a non-zero order of the electromagnetic radiation into a constituent spectra, and direct the constituent spectra onto the first focal plane array;
   wherein the dispersive element is further configured to reflect a zero order of the electromagnetic radiation through the polarity discriminating element and onto the second focal plane array as polarized electromagnetic radiation; and
   a classifier receptive to the constituent spectra and the polarized electromagnetic radiation, configured to at least determine a polarization of the electromagnetic radiation.

2. The imaging system of claim 1, wherein the first focal plane array and the second focal plane array are configured to share a common readout clock.

3. The imaging system of claim 2, wherein the common readout clock comprises a first readout clock associated with the first focal plane array, and a second readout clock associated with the second focal plane array, and wherein the first and second readout clocks are synchronized.

4. The imaging system of claim 1, wherein the first focal plane array and the second focal plane array are constituent parts of a single focal plane array element, and wherein the polarity discriminating element is associated with only the second focal plane array of the single focal plane array element.

5. The imaging system of claim 1, wherein the second focal plane array comprises a plurality of pixels, and wherein the polarity discriminating element comprises an array of polarity discriminating filters, wherein the polarity discriminating filters are associated with the plurality of pixels.

6. The imaging system of claim 5, wherein each polarity discriminating filter is polarized according to one of at least three different polarizations, including linear polarizations and/or circular polarizations.

7. The imaging system of claim 6, wherein the classifier is further configured to calculate Stokes vector components of light from the polarized electromagnetic radiation received by the second focal plane array.

8. The imaging system of claim 1, wherein the first focal plane array is a two-color focal plane array, and wherein the dispersive element is configured to disperse the electromagnetic radiation into lower and higher diffraction orders of electromagnetic radiation associated with longer and shorter wavelengths bands of electromagnetic radiation, directed to the two-color focal plane array.

9. The imaging system of claim 8, wherein the two-color focal plane array comprises an upper active area configured to absorb the shorter wavelength band electromagnetic radiation, and a lower active area configured to absorb the longer wavelength band electromagnetic radiation.

10. The imaging system of claim 9, wherein the upper active area and the lower active area are configured to share a common readout clock.

11. The imaging system of claim 10, wherein second focal plane array is further configured to share the common readout clock.

12. The imaging system of claim 1, further comprising an output configured to output correlated hyperspectral data from the first focal plane array and polarimetric data from the second focal plane array.

13. The imaging system of claim 12, wherein the hyperspectral data and the polarimetric data are correlated by a common readout clock.

14. The imaging system of claim 1, further comprising a collimator configured to align the electromagnetic radiation prior to the dispersive element receiving the electromagnetic radiation.

15. The imaging system of claim 1, wherein the dispersive element is a diffraction grating.

16. An imaging system comprising:
    a dispersive element configured to receive incident electromagnetic radiation, wherein the dispersive element is configured to disperse a lower diffraction order of the electromagnetic radiation into a longer wavelength band electromagnetic radiation, and a higher diffraction order of the electromagnetic radiation into a shorter wavelength band electromagnetic radiation, and wherein the dispersive element is further configured to reflect a zero diffraction order of the electromagnetic radiation as reflected electromagnetic radiation;
    a two-color focal plane array having an upper active area and a lower active area, the upper active area configured to absorb the shorter wavelength band electromagnetic radiation, and the lower active area configured to absorb the longer wavelength band electromagnetic radiation; and
    a second focal plane array having an associated polarity discriminating element, wherein the polarity discriminating element is configured to receive the reflected electromagnetic radiation and polarize the reflected electromagnetic radiation as polarized electromagnetic radiations to permit determination of a polarization of the electromagnetic radiation, and wherein the second focal plane array is configured to receive the polarized electromagnetic radiations.

17. The imaging system of claim 16, wherein a common readout clock is shared by the upper active area and the lower active area of the two-color focal plane array, and the second focal plane array.

18. The imaging system of claim 16, wherein the common readout clock comprises a first readout clock associated with the two-color focal plane array, and a second readout clock associated with the second focal plane array, and wherein the first and second readout clocks are synchronized.

19. The imaging system of claim 16, wherein the dispersive element is a diffraction grating.

20. A method for imaging comprising:
    receiving electromagnetic radiation on a dispersive element configured to diffract the electromagnetic radiation into a zero order electromagnetic radiation and at least one non-zero order electromagnetic radiation;
    receiving the non-zero order electromagnetic radiation on a first focal plane array;
    polarizing the zero order electromagnetic radiation into polarized electromagnetic radiations with a polarity discriminating element configured to permit determination of a polarization of the electromagnetic radiation;
    receiving the polarized electromagnetic radiations on a second focal plane array;

synchronously reading out hyperspectral data from the first focal plane array, and polarimetric data from the second focal plane array; and determining the polarization of the electromagnetic radiation.

21. The method of claim 20, wherein synchronously reading out the hyperspectral data and the polarimetric data comprises the first focal plane array sharing a common readout clock with the second focal plane array.

22. The method of claim 20, wherein the first focal plane array is a two-color focal plane array having an upper active area and a lower active area, and wherein receiving the non-zero order electromagnetic radiation on the first focal plane array comprises receiving a shorter wavelength band of the electromagnetic radiation on the upper active area, and receiving a longer wavelength band of the electromagnetic radiation on the lower active area.

23. The method of claim 22, wherein synchronously reading out the hyperspectral data and the polarimetric data comprises each of the upper active area and the lower active area of the first focal plane array sharing a common readout clock with the second focal plane array.

* * * * *